United States Patent [19]
Brandt et al.

[11] Patent Number: 5,827,462
[45] Date of Patent: Oct. 27, 1998

[54] BALANCED COOLING OF EXTRUDED SYNTHETIC WOOD MATERIAL

[75] Inventors: Jeffrey R. Brandt, Blacklick; William G. Taylor, Columbus; James M. Miller, Millersport, all of Ohio

[73] Assignee: Crane Plastics Company Limited Partnership, Columbus, Ohio

[21] Appl. No.: 735,323

[22] Filed: Oct. 22, 1996

[51] Int. Cl.$^6$ .............................. D01F 13/00; A01J 21/00
[52] U.S. Cl. .............................. 264/179; 425/67; 425/71; 425/378.1
[58] Field of Search .................................... 422/131, 133, 422/138; 264/118, 122, 178 R, 179, 180; 425/67, 71, 378.1, 377, 131.1

[56] References Cited

U.S. PATENT DOCUMENTS

| | | | |
|---|---|---|---|
| 2,010,207 | 8/1935 | Topham et al. | 425/67 |
| 2,188,396 | 1/1940 | Semon | 18/55 |
| 2,489,373 | 11/1949 | Gilman | 260/37 |

(List continued on next page.)

FOREIGN PATENT DOCUMENTS

| | | |
|---|---|---|
| 93306843.9 | 8/1993 | European Pat. Off. . |
| 93306844.7 | 8/1993 | European Pat. Off. . |
| 93306845.4 | 8/1993 | European Pat. Off. . |
| 74 06548 | 2/1974 | France . |
| 76 28288 | 9/1976 | France . |
| 79 10288 | 4/1979 | France . |
| 84 07466 | 5/1984 | France . |
| 2042176 | 4/1971 | Germany . |
| 44033/73 | 9/1973 | Germany . |
| 3801574 | 1/1988 | Germany . |
| 63-162216 | 5/1988 | Japan . |
| 82 23635 | 8/1982 | United Kingdom . |
| 86 04589 | 2/1986 | United Kingdom . |
| 87 02959 | 2/1987 | United Kingdom . |
| PCT/SE90/ 00014 | 1/1990 | WIPO . |

OTHER PUBLICATIONS

Dalväg et al., The Efficiency of Cellulosic Fillers in Common Thermoplastics. Part II. Filling with Processing Aids and Coupling Agents, 1985, vol. 11, pp. 9–38.

Klason et al., The Efficiency of Cellulose Fillers in Common Thermoplastics. Part 1. Filling without Processing Aids or Coupling Agents, Polymeric Materials, 1984, vol. 10, pp. 159–187.

Kokta et al., Composites of Poly(Vinyl Chloride) and Wood Fibers. Part II: Effect of Chemical Treatment, Polymer Composites, Apr. 1990, pp. 84–89.

Kokta et al., Composites of Polyvinyl Chloride–Wood Fibers. I. Effect of Isocyanate as a Bonding Agent, Polym.–Plast. Technol. Eng., 1990, 29(1&2), pp. 87–118.

Kokta et al., Composites of Polyvinyl Chloride–Wood Fibers. III: Effect of Silane as Coupling Agent, Journal of Vinyl Technology, Sep. 1990, pp. 146–153.

Kokta et al., Use of Wood Fibers in Thermoplastic Composites, Polymer Composites, Oct. 1983, pp. 229–232.

Maldas et al., Composites of Polyvinyl Chloride–Wood Fibers: IV. Effect of the Nature of Fibers, Journal of Vinyl Technology, Jun. 1989, pp. 90–98.

Myers et al., Bibliography: Composites from Plastics and Wood–Based Fillers, USDA Forest Products Laboratory, Madison, WI, pp. 1–27 odds (1991).

Myers et al., Effects of Composition and Polypropylene Melt Flow on Polypropylene–Waste Newspaper Composites, ANTEC, 1984, pp. 602–604.

Raj et al., Use of Wood Fiber as Filler in Common Thermoplastics: Studies on Mechanical Properties, Science and Engineering of Composite Materials, vol. 1 No. 3, 1989, pp. 85–98.

(List continued on next page.)

Primary Examiner—Nina Bhat
Attorney, Agent, or Firm—Standley & Gilcrest

[57] ABSTRACT

An extrusion process is described in which a balanced cooling apparatus is incorporated. The cooling apparatus provides a coolant bath to an extruded component.

9 Claims, 2 Drawing Sheets

U.S. PATENT DOCUMENTS

| | | | |
|---|---|---|---|
| 2,514,471 | 7/1950 | Calhoun | 425/67 |
| 2,519,442 | 8/1950 | Delorme et al. | 260/37 |
| 2,728,104 | 12/1955 | Fisch | 18/12 |
| 2,935,763 | 5/1960 | Newman et al. | 18/55 |
| 3,287,480 | 11/1966 | Wechsler et al. | 264/122 |
| 3,308,507 | 3/1967 | Black | 425/67 |
| 3,538,210 | 11/1970 | Gatto | 264/90 |
| 3,562,373 | 2/1971 | Logrippo | 264/118 |
| 3,645,939 | 2/1972 | Gaylord | 260/17.4 GC |
| 3,804,574 | 4/1974 | Gatto | 425/388 |
| 3,867,493 | 2/1975 | Seki | 264/45.9 |
| 3,878,143 | 4/1975 | Baumann et al. | |
| 3,879,505 | 4/1975 | Boutillier et al. | 264/48 |
| 3,888,810 | 6/1975 | Shinomura | 260/17.4 BB |
| 3,922,328 | 11/1975 | Johnson | 264/46.1 |
| 3,943,079 | 3/1976 | Hamed | 260/17.4 BB |
| 3,956,541 | 5/1976 | Pringle | 428/2 |
| 4,012,348 | 3/1977 | Chelland et al. | 260/28.5 R |
| 4,016,232 | 4/1977 | Pringle | 264/112 |
| 4,016,233 | 4/1977 | Pringle | 264/122 |
| 4,018,722 | 4/1977 | Baker | 260/2.3 |
| 4,029,452 | 6/1977 | Schippers et al. | 425/71 |
| 4,045,603 | 8/1977 | Smith | 428/2 |
| 4,054,632 | 10/1977 | Franke | 264/145 |
| 4,056,591 | 11/1977 | Goettler et al. | 264/108 |
| 4,071,479 | 1/1978 | Broyde et al. | 260/2.3 |
| 4,071,494 | 1/1978 | Gaylord | 260/42.14 |
| 4,097,648 | 6/1978 | Pringle | 428/326 |
| 4,102,106 | 7/1978 | Golder et al. | 52/533 |
| 4,107,110 | 8/1978 | Lachowicz et al. | 260/17.4 CL |
| 4,145,389 | 3/1979 | Smith | 264/40.7 |
| 4,157,415 | 6/1979 | Lindenberg | 428/284 |
| 4,168,251 | 9/1979 | Schinzel et al. | 260/17.4 R |
| 4,178,411 | 12/1979 | Cole et al. | 428/310 |
| 4,181,764 | 1/1980 | Totten | 428/155 |
| 4,187,352 | 2/1980 | Klobbie | 521/79 |
| 4,191,798 | 3/1980 | Schumacher et al. | 428/95 |
| 4,192,839 | 3/1980 | Hayashi et al. | 264/45.5 |
| 4,203,876 | 5/1980 | Dereppe et al. | 260/17.4 R |
| 4,221,621 | 9/1980 | Seki et al. | 156/78 |
| 4,228,116 | 10/1980 | Colombo et al. | 264/119 |
| 4,239,679 | 12/1980 | Rolls et al. | 260/42.49 |
| 4,241,133 | 12/1980 | Lund et al. | 428/326 |
| 4,244,903 | 1/1981 | Schnause | 264/68 |
| 4,248,743 | 2/1981 | Goettler | 260/17.4 BB |
| 4,250,222 | 2/1981 | Mavel et al. | 428/285 |
| 4,263,184 | 4/1981 | Leo et al. | 260/17.4 CL |
| 4,263,196 | 4/1981 | Schumacher et al. | 260/33.6 |
| 4,271,107 | 6/1981 | Phipps | 264/51 |
| 4,272,577 | 6/1981 | Lyng | 428/112 |
| 4,273,688 | 6/1981 | Porzel et al. | 260/17.4 R |
| 4,303,019 | 12/1981 | Haataja et al. | 108/51.1 |
| 4,305,901 | 12/1981 | Prince et al. | 264/176 R |
| 4,317,765 | 3/1982 | Gaylord | 523/204 |
| 4,323,625 | 4/1982 | Coran et al. | 428/288 |
| 4,376,144 | 3/1983 | Goettler | 428/36 |
| 4,382,758 | 5/1983 | Nopper et al. | 425/82.1 |
| 4,414,267 | 11/1983 | Coran et al. | 428/288 |
| 4,430,468 | 2/1984 | Schumacher | 524/109 |
| 4,452,752 | 6/1984 | Harder et al. | 264/555 |
| 4,480,061 | 10/1984 | Couglin et al. | 524/13 |
| 4,491,553 | 1/1985 | Yamada et al. | 264/51 |
| 4,505,869 | 3/1985 | Nishibori | 264/115 |
| 4,506,037 | 3/1985 | Suzuki et al. | 521/82 |
| 4,508,595 | 4/1985 | Gåsland | 162/158 |
| 4,562,218 | 12/1985 | Fornadel et al. | 524/15 |
| 4,594,372 | 6/1986 | Natov et al. | 523/208 |
| 4,597,928 | 7/1986 | Terentiev et al. | 264/87 |
| 4,610,900 | 9/1986 | Nishibori | 428/15 |
| 4,645,631 | 2/1987 | Hegenstaller et al. | 264/69 |
| 4,659,754 | 4/1987 | Edwards et al. | 523/214 |
| 4,687,793 | 8/1987 | Motegi et al. | 523/200 |
| 4,717,742 | 1/1988 | Beshay | 523/203 |
| 4,737,532 | 4/1988 | Fujita et al. | 524/13 |
| 4,783,493 | 11/1988 | Motegi et al. | 524/13 |
| 4,791,020 | 12/1988 | Kokta | 428/326 |
| 4,820,749 | 4/1989 | Beshay | 523/203 |
| 4,851,458 | 7/1989 | Hopperdietzel | 523/205 |
| 4,889,673 | 12/1989 | Takimoto | 264/118 |
| 4,894,192 | 1/1990 | Warych | 264/68 |
| 4,915,764 | 4/1990 | Miani | 156/244.19 |
| 4,927,572 | 5/1990 | van der Hoeven | 264/22 |
| 4,927,579 | 5/1990 | Moore | 264/101 |
| 4,929,167 | 5/1990 | Pepper | 425/325 |
| 4,935,182 | 6/1990 | Ehner et al. | 264/112 |
| 4,968,463 | 11/1990 | Levasseur | 264/40.1 |
| 5,008,310 | 4/1991 | Beshay | 524/13 |
| 5,009,586 | 4/1991 | Pallmann | 425/311 |
| 5,075,359 | 12/1991 | Castagna et al. | 524/13 |
| 5,078,937 | 1/1992 | Eela | 264/109 |
| 5,082,605 | 1/1992 | Brooks et al. | 264/40.6 |
| 5,087,400 | 2/1992 | Theuveny | 264/115 |
| 5,088,910 | 2/1992 | Goforth et al. | 425/142 |
| 5,096,046 | 3/1992 | Goforth et al. | 198/604 |
| 5,096,406 | 3/1992 | Brooks et al. | 425/205 |
| 5,120,776 | 6/1992 | Raj et al. | 524/13 |
| 5,137,673 | 8/1992 | Bourcier et al. | 264/151 |
| 5,153,241 | 10/1992 | Beshay | 524/8 |
| 5,167,891 | 12/1992 | Dijkman, Sr. et al. | 264/145 |
| 5,194,461 | 3/1993 | Bergquist et al. | 524/13 |
| 5,272,000 | 12/1993 | Chenoweth et al. | 428/283 |
| 5,276,082 | 1/1994 | Forry et al. | 524/504 |
| 5,288,772 | 2/1994 | Hon | 524/35 |
| 5,302,634 | 4/1994 | Mushovic | 523/219 |
| 5,369,147 | 11/1994 | Mushovic | 523/219 |
| 5,406,768 | 4/1995 | Giuseppe et al. | 52/730.3 |
| 5,424,023 | 6/1995 | Riley et al. | 264/560 |
| 5,474,722 | 12/1995 | Woodhams | 264/45.3 |
| 5,480,602 | 1/1996 | Nagaich | 264/122 |
| 5,486,553 | 1/1996 | Deaner et al. | 524/13 |
| 5,497,594 | 3/1996 | Giuseppe et al. | 52/730.4 |
| 5,516,472 | 5/1996 | Laver | 264/118 |
| 5,518,677 | 5/1996 | Deaner et al. | 425/308 |
| 5,539,027 | 7/1996 | Deaner et al. | 524/13 |
| 5,576,374 | 11/1996 | Betso et al. | 524/451 |
| 5,585,155 | 12/1996 | Heikkila et al. | 428/36.7 |
| 5,593,625 | 1/1997 | Riebel et al. | 264/115 |
| 5,597,586 | 1/1997 | Wilson et al. | 425/67 |

OTHER PUBLICATIONS

Raj et al., Use of Wood Fibers in Thermoplastics. VII. The Effect of Coupling Agents in Polyethylene–Wood Fiber Composites, Journal of Applied Polymer Science, vol. 7, pp. 1089–1103 (1989).

Sonwood Outline, Apr., 1975.

Thomas et al., Wood Fibers for Reinforcing Fillers for Polyolefins, ANTEC, 1984, pp. 687–689.

Woodhams et al., Wood Fibers for Reinforcing Fillers for Polyolefins, Polymer Engineering and Science, Oct. 1984, pp. 1166–1171.

Yam et al., Composites from Compounding Wood Fibers With Recycled High Density Polyethylene, Polymer Engineering and Science, mid–Jun. 1990, pp. 693–699.

Zadroecki et al., Future Prospects for Wood Celluslose as Reinforcement In Organic Polymer Composites Polymer Composites, Apr. 1989, pp. 69–77.

Collier et al., High Strength Extrudates by Melt Transformation Coextrusion, ANTEC, 1987, pp. 497–502.

Collier et al., Streamlined Dies and Profile Extrusion, ANTEC, 1987, pp. 203–206.

BALANCED COOLING OF EXTRUDED SYNTHETIC WOOD MATERIAL

BACKGROUND AND SUMMARY OF THE INVENTION

The present invention relates generally to wood replacement materials. In particular, the present invention relates to a wood-polymer composite material suitable for use in place of natural wood. The present invention describes a process for manufacturing the composite materials.

For several reasons, there is a need to find materials that exhibit the look and feel of natural wood. One reason has to do with the supply of good wood for construction purposes from the world's forests. This supply of wood from mature trees has become an important issue in recent years and as a result the cost of wood has risen.

Several attempts have been made by others to find a wood like material. Many of these efforts have failed due to the qualities of the resultant product.

In addition to natural wood, other materials such as particle board, wafer board, and the like may be replaced by the synthetic wood of the present invention. One noticeable improvement over these materials is that synthetic wood has enhanced moisture resistance.

The present invention overcomes many of the disadvantages of the prior art attempts at a quality wood replacement material that is capable of being produced in a commercially practicable production environment. The present invention includes the combining of cellulosic material with a thermoplastic material and optionally with a cross-linking agent to form a combined product. In the present invention an extrusion of the combined product under sufficient conditions to blend the combined product into a homogeneous mixture is described. The mixture of material is extruded through at least one die in a manner described in greater detail hereinafter.

The extruder preferably comprises a hopper to receive and mix the organic fibrous material and the thermoplastic material before being extruded through the die system. In a preferred material composition of the present invention, the synthetic wood material includes approximately two-thirds organic fibrous or cellulosic material and approximately one-third thermoplastic material in combination. The resultant product has an appearance similar to wood and may be sawed, sanded, shaped, turned, fastened and/or finished in the same manner as natural wood. The resultant product is resistant to rot and decay as well as termite attack. The resultant product may be used for example as, decorative moldings inside or outside of a house, picture frames, furniture, porch decks, window moldings, window components, door components, roofing systems, and any other type of use where structural requirements do not exceed the physical properties of the resultant material.

A cooling tank is secured adjacent a die or packer component of the extrusion system, for submersing or partially submersing the extruded material as it exits the die or packer, with a coolant such as water.

The present invention is useful in a number of different extrusion environments in which at least one extrusion die and/or a packer are employed. More particularly, in a preferred embodiment of the present invention, it is useful in conjunction with the synthetic wood composition and method as described in U.S. Pat. No. 5,516,472 which issued on May 14, 1996 entitled EXTRUDED SYNTHETIC WOOD COMPOSITION AND METHOD FOR MAKING SAME.

DETAILED DESCRIPTION OF PREFERRED EMBODIMENT(S)

Figure 1:
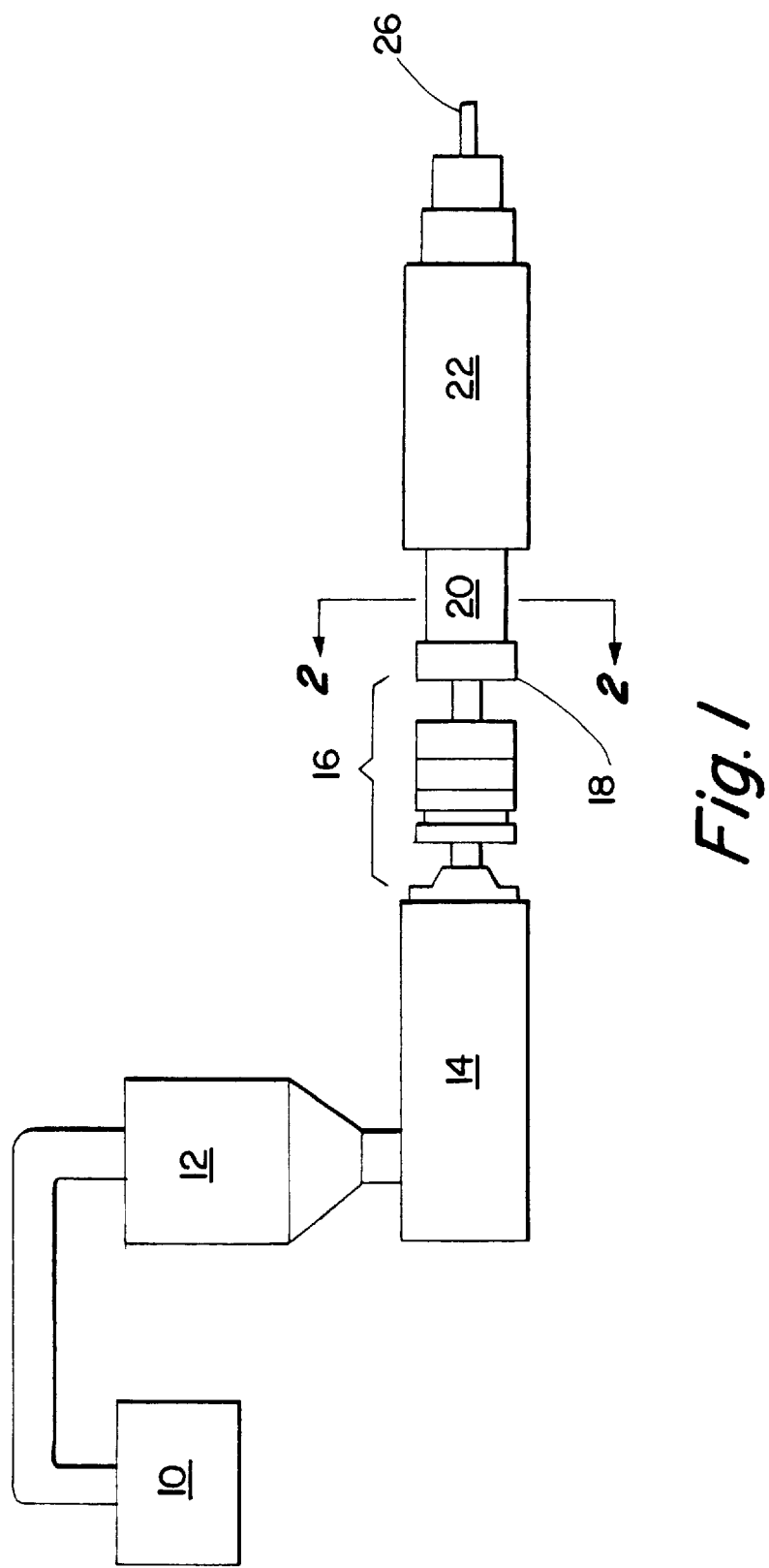
FIG. 1 is a schematic diagram illustrating the process of the present invention.

The present invention is directed toward synthetic wood extrusions of the type in which synthetic wood material composites are extruded through at least one die into and adjacent a profile or packer component. The die may produce strands of the composite material that flow into the packer or in another embodiment of the invention, the die may simply produce one flowable homogeneous mass of material into the packer. In either case, the essence of the present invention is that the packer is of a substantially reduced cross-section area from that of the adjacent die, causing the composite extruded material to be compressed as it passes through the packer.

As the strands, in one embodiment, leave the stranding die and enter the packer the material is compressed causing the material to bond to adjacent material strands. In a packer, the final shape is maintained while the cross linking agents continue to react which bond the material together along with the individual cellulose molecular chains. The formed product is then cooled in a cooling tank and transported to an area where it may be cut into desired lengths.

The cellulosic fibrous-polymer composite material used in the present invention may have a higher cellulosic fiber content then normally recognized. The overall process may include the mixing of raw materials including cellulosic fibers, thermoplastic materials, cross-linking agents and process lubricants. The cellulosic material may be any one or more cellulosic materials such as sawdust, newspapers, alfalfa, wheat pulp, wood chips, wood fibers, wood particles, ground wood, wood flour, wood flakes, wood veneers, wood laminates, paper, cardboard, straw, cotton, rice halls, coconut shells, peanut shells, bagass, plant fibers, bamboo or palm fiber, and kenaf. Cellulosic material is first dried to a low moisture content. Although apparently not critical a preferred moisture content is about 1%–10%.

Thermoplastic materials may include multilayer films, polyethylene, polypropylene, polyvinyl chloride (PVC), low density polyethylene (LDPE), ethyl-vinyl acetate, other polyethylene copolymer and other thermoplastics.

Examples of cross-linking agents include polyurethanes, such as isocynate, phenolic resins, unsaturated polyesters and epoxy resins and combinations of the same. Lubricants may be added as a process aid. Examples of lubricants include zinc stearate or wax. Other materials may be added which are known to the art of extrusion and include accelerators, inhibitors, enhancers, compatibilizers and blowing agents.

Two example formulation recipes are described below:

|  | Amount (parts per total) |
| --- | --- |
| Recipe A |  |
| Wood Flour (40/mesh maple) | 250 |
| Polyethylene (HDPE) | 100 |
| Zinc Stearate | 7.5 |
| External Wax | 5 |
| Phenolic Resin | 15 |
| Isocyanate (MDI) | 2.5 |
| Recipe B |  |
| Wood Flour (40/mesh maple) | 250 |
| PVC | 100 |
| Lubricant (ester) | 3 |
| External Wax | 4 |
| Process Aids (acrylic) | 4 |
| Calcium Stearate | 2 |
| Tin Stabilizer | 2 |

In the preferred embodiment of the present invention, as shown in FIG. 1, the cellulosic fiber, thermoplastic raw materials, and other minor ingredients are physically mixed in an industrial blender or other conventional mixer device 10. The composition may then be introduced into a hopper 12. A typical feed hopper may be used such as a gravity feed hopper or a hopper with a force feed mechanism known as a crammer, to introduce the material to an extruder 14. The preferred process temperature at the extruder is about 325° F. Several well known extruders may be used in the present invention. A twin screw extruder by Cincinnati Milacron (CM-80-BP) may be used. In the extruder, the materials are blended and heated and then forced into a die system. The flow rate of the extruder may be between about 150 and 600 pounds per hour. The die system 16 is made up of one or more plates. The die system allows the starting materials to bond and form a shaped-homogeneous product. A typical plate may be made from cast iron and stainless steel material.

In one embodiment the die system is comprised of a plurality of plates nested together to form one continuous die. The first die connected to the extruder is known as an adapter die. Following the adapter die is a transition die. The transition die transforms the combined material discharged from the round stock exiting the adapter die to a shape more generally approaching that of the finished product. Following the transition die is a stranding die. The stranding die plate has multiple apertures which may be substantially round. In a preferred embodiment the stranding die contains apertures which are approximately one-eighth of an inch or greater in diameter. As the material leaves the stranding die it leaves in strands of homogeneous material which are compressed together in a molding die. The molding die is contemplated to take a shape of many common items such as decorative house hold moldings including crown moldings, chair rails, baseboards, door moldings, picture frames, furniture trim, and other products. After passing through the molding die the material enters the setting die where the final shape is maintained. This setting die is also known as the packer 18. The final shape is maintained yet substantially compressed in overall cross section area.

The improvement of the present invention lies in the cooling of the extruded product as it leaves the packer. It has been known to cool extruded products in a spray mist chamber at some point following the die system in the manufacturing process. The applicant has discovered that with the composite materials of the present invention it is preferred to bathe the extruded product upon the extruded product leaving the packer.

Figure 2:
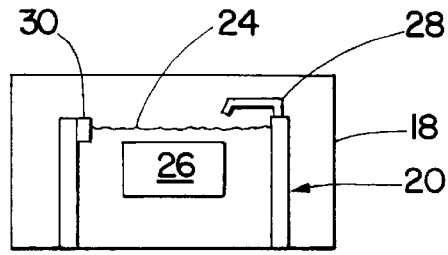
FIG. 2 is a perspective view of a balance cooling apparatus of the present invention.
Figure 3:
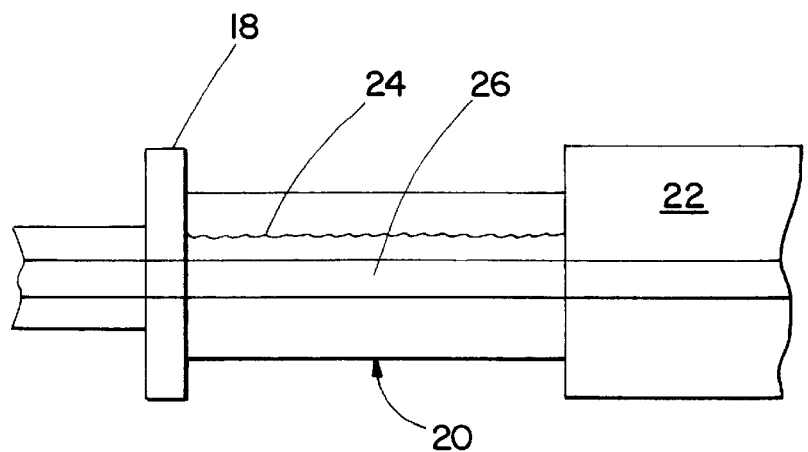
FIG. 3 is an elevation view of one embodiment of the present invention in which the extruded material is completely submersed in a coolant.

A cooling tank 20, as shown in FIG. 2, is assembled adjacent the packer 18 and before a spray mist chamber 22. A water level 24 (or in place of water other coolants may be used which are not harsh to the extruded material) is maintained within the tank in order to have the extruded product 26 totally submersed (as shown in FIG. 3) as it exits the packer into the water tank. The water temperature within the tank is maintained by a cool water flow (such as cool tap water) through a water inlet 28 to the tank while an equal amount of water is exiting the tank through a drain 30. In this manner, the heat of the extruded product does not cause the water temperature to rise over a period of time since fresh water is always being supplied to the tank.

Figure 4:
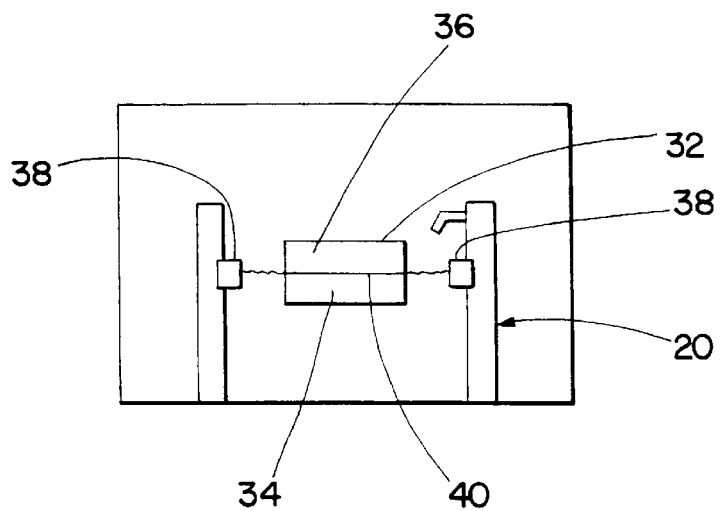
FIG. 4 is an elevation view of a second embodiment of the present invention in which a coextrusion material has a first portion submersed in a coolant while a second portion of said material is above the level of the coolant.

In another embodiment of the present invention, as shown in FIG. 4, a coextrusion 32 is introduced to the coolant bath in the tank 20 in a manner which allows the composite synthetic wood material portion 34 to be submersed while the added coextruded material 36 remains above the water level. This partially submersed technique is advantageous because it may not be beneficial to the coextruded upper layer of material to be submersed in water due to its particular properties. Drains 38 are positioned at the level necessary in the tank to maintain the coolant level just at or below the line 40 of attachment between the first and second portions of the coextrusion.

The water bath results in more even balanced cooling throughout the cross sectional area of the extruded product and is a significant improvement over other cooling methods which do not cool the extruded product in as efficient and thorough manner as the present invention.

The above described advantages and features of the present invention are offered as an example of the way in which the present invention may be commercially implemented. The embodiments listed herein are, therefore, exemplary in nature and are not intended to unnecessarily limit the scope of the following claims.

What is claimed is:

1. A method for cooling an extruded synthetic wood product, said method comprising:

providing an extruder;

attaching at least one die to said extruder;

attaching a cooling tank to said at least one die, said cooling tank containing a level of coolant sufficient to totally submerse said extruded synthetic wood product;

extruding synthetic wood material through said at least one die to form said extruded synthetic wood product; and totally submersing said extruded synthetic wood product in said coolant immediately after said extruded synthetic wood product exits said at least one die.

2. The method of claim 1 wherein said coolant is comprised of water.

3. The method of claim 1 further comprising maintaining a predetermined temperature range of said coolant in said cooling tank by providing a flow of coolant into said cooling tank while a substantially equal amount of said coolant exits said cooling tank.

4. The method of claim 1 wherein said synthetic wood material is comprised of 50% to 70% cellulosic material and 20% to 40% thermoplastic material.

5. A method for cooling a coextruded product having a first portion and a second portion, said method comprising:

provi ding an extruder;

attaching at least one die to said extruder;

attaching a cooling tank to said at least one die, said cooling tank containing a level of coolant substantially sufficient to totally submerse said first portion of said coextruded product in said coolant while said second portion of said coextruded product remains above said level of said coolant;

extruding material through said at least one die to form said coextruded product; and substantially submersing said first portion of said coextruded product in said coolant immediately after said coextruded product exits said at least one die while said second portion of said coextruded product remains substantially above said level of said coolant.

6. The method of claim 5 wherein said coolant is comprised of water.

7. The method of claim 5 further comprising maintaining a predetermined temperature range of said coolant in said cooling tank by providing a flow of coolant into said cooling tank while a substantially equal amount of said coolant exits said cooling tank.

8. The method of claim 5 wherein said first portion of said coextruded product is comprised of synthetic wood material.

9. The method of claim 8 wherein said synthetic wood material is comprised of 50% to 70% cellulosic material and 20% to 40% thermoplastic material.

* * * * *